UNITED STATES PATENT OFFICE.

GEORGE B. BURNHAM, OF BERKELEY, CALIFORNIA.

PROCESS OF RECOVERING POTASSIUM SODIUM SULFATE AND OTHER POTASSIUM SALTS FROM SALINE WATERS.

1,328,418.   Specification of Letters Patent.   Patented Jan. 20, 1920.

No Drawing.   Application filed July 1, 1918. Serial No. 242,936.

*To all whom it may concern:*

Be it known that I, GEORGE B. BURNHAM, a citizen of the United States, and a resident of Berkeley, county of Alameda, State of California, have invented a certain new and useful Process of Recovering Potassium Sodium Sulfate and other Potassium Salts from Saline Waters, of which the following is a specification.

The invention relates to a process of recovering potassium sodium sulfate and potassium sulfate from saline waters, and particularly from the brines of the alkali lakes of the western United States.

An object of the invention is to provide a process for recovering potassium sodium sulfate from saline waters containing potassium, sodium and sulfate ions.

Another object of the invention is to provide a process for refining the double salts of potassium and sodium recovered from the saline waters.

The invention possesses other advantageous features, some of which, with the foregoing, will be set forth at length in the following description, where I shall outline in full the process of my invention and several modifications thereof. I shall describe the process as applied to the brine of Searles Lake in California, but it is to be understood that the process is not limited to this particular brine.

Searles Lake brine contains sodium and potassium chlorid sulfate carbonate and borate and is nearly saturated with sodium chlorid. By the process of my invention I am able to employ natural temperatures for evaporation and cooling to cause the crystallization of the double potassium sodium salts. I prefer to make use of the temperature variations of winter and summer but in some instances it may be possible to carry out the process with the difference in temperature between day and night and if the climatic changes in temperature are not sufficient, it may be necessary to use artificial variations in temperature.

The double salt of sodium and potassium which is crystallized out in this process is a sulfate which I believe has the formula $K_4Na_2(SO_4)_3$, but other similar formulas such as $K_3Na_2(SO_4)_2$ may be formed by this double salt. This salt is rich in potassium and can be used as a fertilizer and its cost of production will probably be less than the cost of potassium chlorid.

In the preferred form of the process, the brine is pumped from the lake in winter into a pond for cooling. The brine is cooled to about $-3°$ C. crystals of Glauber salt, $Na_2SO_4.10H_2O$ will first crystallize out, leaving sufficient sulfate ions in solution to form the double salt of sodium potassium sulfate later. Care should be taken in this pond to prevent the solution from reaching a temperature below $-3°$ C., or approximately such temperature, since it would result in the removal from the brine of too many $SO_4$ ions, consequently, the double salts of sodium potassium sulfate would not be formed later. The particular temperature to which the brine may be cooled without removing too many $SO_4$ ions is variable and I do not limit myself to the temperature stated.

After the crystals of Glauber salt are formed, the brine is then removed to another pond to prevent resolution of the Glauber salts and in the second pond is evaporated at a higher temperature (preferably that due to summer heat) to deposit sodium chlorid. This evaporation is continued until the solution becomes thoroughly saturated with the double salt of sodium and potassium. The brine is then flowed into a deep pond separating the brine from the sodium chlorid crystals and evaporation is then continued during the summer to precipitate crystals of sodium chlorid and potassium sodium sulfate. As the evaporation and crystallization continues the solution will become saturated with potassium chlorid and at this point the solution is withdrawn from this pond and flowed into another pond where it is cooled in winter to precipitate potassium chlorid crystals. Deep ponds are preferably used in order that evaporation will take place slowly, thereby maintaining equilibrium in the brine. By the use of deep ponds the temperature is maintained more nearly even and evaporation is slower, which tends to form large crystals and the deep ponds also allow the change of brine from one pond to another to conform to the seasonal temperature changes. Since the lake brine is saturated with sodium chlorid, both sodium chlorid and potassium sodium sulfate crystals will be formed together, but these may be readily separated from each other afterward by various processes.

The crystals of sodium chlorid and potassium sodium sulfate are then removed from the pond and treated to separate the sodium chlorid from the double sulfate. This may be done in several different ways. In actual practice, employing solar evaporation, it is found that most of the sodium chlorid is formed in much larger crystals than the potassium sodium sulfate. The mass of crystals is broken up or gently crushed to separate the crystals and is then filtered or allowed to drain to eliminate most of the mother liquor. The separated crystals are then passed over a screen having approximately 30 apertures to the inch and are sprayed with water which washes all the fine crystals through the screen and leaves the large crystals which are mostly sodium chlorid remaining on the screen.

The crystals of the double salts are much smaller than the crystals of the sodium chlorid and therefore the crystals of the double salts are driven through the screen by the water. The function of the water is not to dissolve the crystals, but to drive the smaller crystals through the screen. The resultant brine is heavily laden with fine crystals, there being about one-half liquor and one-half fine crystals. The material is allowed to settle and the fine sodium chlorid crystals which have passed through the screen settle to the bottom, leaving the double salt crystals on top. The sodium chlorid crystals are cubes while the potassium sodium sulfate crystals are flat and flaky and are very fine, with the result that they settle through the brine very slowly and consequently settle on top of the sodium chlorid crystals. The top layer of salts may then be removed, thereby separating the double salts from the sodium chlorid. If a finer separation is desired, this process may be repeated. The brine formed by washing the crystals through the screen with water may be subsequently used to wash other crystals through the screen and since this brine is saturated with the salts of these crystals, it will thereafter not dissolve any crystals and will act merely as a mechanical means for driving the smaller crystals through the screen. The double salts of sodium and potassium may then be dried or filtered to remove the excess brine and is then ready for the market, as a fertilizer. When desirable, however, this double salt may be refined to produce potassium sulfate and Glauber salt. Various processes for the refining of this double salt may be used, depending upon the percentage of sodium chlorid crystals in the double salt.

The double salts may be partially dissolved in a minimum amount of cold water whereby the following chemical reaction takes place:

$$K_4Na_2(SO_4)_3 + 10H_2O = 2K_2SO_4 + Na_2SO_4.10H_2O$$

The potassium sodium sulfate goes into solution and then recrystallizes out in the cold water as potassium sulfate and Glauber salts ($Na_2SO_4.10H_2O$). More potassium sodium sulfate goes into solution and more potassium sulfate and Glauber salts crystallize out and this continues until the complete change has taken place. The potassium sulfate is then separated from the Glauber salts by mechanical means or by washing.

The double salts may be dissolved in water and concentrated by evaporation and then the solution cooled to crystallize out potassium sulfate. Cooling is continued until saturation with Glauber salt is obtained. At this point the solution is removed from the deposited crystals and the cooling is continued to crystallize out Glauber salts. In order to prevent small amounts of potassium sulfate that might come out due to this further cooling, water can be added just in sufficient amount to prevent the formation of potassium sulfate crystals. With the mother liquor that is left the process is repeated until all of the potassium sulfate is eventually recovered. When there is still some sodium chlorid mixed with the double salt, another method may be used. In accordance with this method the salts are dissolved in water and cooled to crystallize out Glauber salt. The solution is then removed from the deposited salts and evaporated to crystallize out the double potassium sodium sulfate. This double salt continues to be deposited until the solution becomes saturated with potassium chlorid. At this point the solution is removed to another vat and evaporation is continued there to deposit potassium sodium sulfate and potassium chlorid together, until the solution becomes saturated with sodium chlorid, that is, until it becomes saturated with potassium sodium sulfate, potassium chlorid and sodium chlorid. The solution is then removed from the deposited crystals and cooled to crystallize out potassium chlorid.

In the event that a considerable proportion of sodium chlorid is still mixed with the potassium sodium sulfate, another method may be used. In accordance with this method the salts are dissolved in water and cooled to crystallize out Glauber salts. The solution is then removed from the deposited crystals and evaporated at a higher temperature to deposit potassium sodium sulfate. This double salt continues to be deposited until the solution becomes saturated with sodium chlorid. At this point the solution is removed from the deposited crystals and further evaporation causes the deposit of sodium chlorid and potassium sodium sulfate crystals. Evaporation is continued at this point until the solution becomes saturated with potassium chlorid, and at that time the solution is removed from the deposited crystals and cooled to crystallize out the potassium chlorid.

Another method may be used where sodium chlorid is mixed with the potassium sodium sulfate and in this method the cooling step is eliminated. The salts are dissolved in water and evaporated to cause a deposit of potassium sodium sulfate crystals. This evaporation is continued until the solution becomes saturated with sodium chlorid. At that point the solution is removed from the deposited crystals and evaporated further to produce the deposit of crystals of potassium sodium sulfate and sodium chlorid. This evaporation is continued until the solution becomes saturated with potassium chlorid at which time the solution is removed from the deposited crystals and then cooled to crystallize out potassium chlorid. The mixed crystals of sodium chlorid and potassium sodium sulfate may then be treated as set forth previously to separate the salts from each other. Still another method is available for refining the double salts when mixed with sodium chlorid. The salts are dissolved in water and evaporated whereby the double salt of potassium sodium sulfate is deposited and evaporation is continued until saturation with sodium sulfate is obtained. At this time the solution is removed from the deposited crystals and cooled to crystallize out sodium sulfate. The solution is then removed from the deposited sodium sulfate crystals and evaporated at a higher temperature to saturation with a potassium salt. This potassium salt may be potassium sodium sulfate or potassium chlorid, depending upon the original concentration of the solution and the degree of cooling which the solution has already received. The solution is then cooled to crystallize out the potassium chlorid.

I claim:

1. The process of recovering potassium and sodium salts from liquor containing potassium, sodium, chlorid and sulfate ions, which consists in cooling the liquor to crystallize out Glauber salts, separating the liquor from the deposited crystals, evaporating the liquor at a higher temperature to crystallize out sodium chlorid, separating the liquor from the deposited crystals and further evaporating the liquor to crystallize out sodium chlorid and potassium sodium sulfate.

2. The process of recovering potassium and sodium salts from liquors containing potassium, sodium, chlorid and sulfate ions, which consists in gradually cooling the liquor to crystallize out Glauber salts, removing the liquor from the deposited crystals, evaporating the removed liquor to crystallize out sodium chlorid and bring the liquor to saturation with potassium sodium sulfate, separating the liquor from the deposited crystals, evaporating the liquor to crystallize out sodium chlorid and potassium sodium sulfate until the liquor becomes saturated with potassium chlorid, and removing the liquor from the deposited crystals.

3. The process of recovering potassium and sodium salts from liquors containing potassium, sodium, chlorid and sulfate ions, which consists in cooling the liquor to crystallize out Glauber salts, separating the liquor from the deposited crystals, evaporating the liquor to crystallize out sodium chlorid, separating the liquor from the deposited crystals, evaporating the liquor to crystallize out sodium chlorid and potassium sodium sulfate, removing the liquor from the deposited crystals, and separating the sodium chlorid from the potassium sodium sulfate.

4. The process of recovering potassium and sodium salts from liquors containing potassium, sodium, chlorid and sulfate ions, which consists in cooling the liquor to crystallize out Glauber salts, separating the liquor from the deposited crystals, evaporating the liquor to crystallize out sodium chlorid, separating the liquor from the deposited crystals, evaporating the liquor to crystallize out sodium chlorid and potassium sodium sulfate, removing the liquor from the deposited crystals, separating sodium chlorid from the potassium sodium sulfate, refining the potassium sodium sulfate into potassium sulfate and Glauber salts.

5. The process of recovering potassium and sodium salts from liquors containing potassium, sodium, chlorid and sulfate ions, which consists in cooling the liquor to crystallize out Glauber salts, leaving sufficient sulfate ions in solution to produce potassium sodium sulfate subsequently, removing the liquor from the deposited crystals, evaporating the liquor to crystallize out sodium chlorid and to bring the liquor to saturation with potassium sodium sulfate, removing the liquor from the deposited crystals, evaporating the liquor to crystallize out sodium chlorid and potassium sodium sulfate, removing the liquor from the deposited crystals and mechanically separating the sodium chlorid from the potassium sodium sulfate.

6. The process of recovering potassium and sodium salts from liquors containing potassium, sodium, chlorid and sulfate ions, which consists in cooling the liquor to crystallize out Glauber salts, separating the liquor from the deposited crystals, evaporating the liquor to crystallize out sodium chlorid, separating the liquor from the deposited crystals, further evaporating the liquor to crystallize out sodium chlorid and potassium sodium sulfate, separating the liquor from the deposited crystals, removing a portion of the sodium chlorid from the mixture of sodium chlorid and potassium sodium sulfate, and treating the remaining mixture to recover the potassium sodium sulfate.

7. The process of recovering potassium and sodium salts from liquors containing potassium, sodium, chlorid and sulfate ions, which consists in cooling the liquor to crystallize out Glauber salts, separating the liquor from the deposited crystals, evaporating the liquor to crystallize out sodium chlorid, separating the liquor from the deposited crystals, further evaporating the liquor to crystallize out sodium chlorid and potassium sodium sulfate, separating the liquor from the deposited crystals, removing a portion of the sodium chlorid from the mixture of sodium chlorid and potassium sodium sulfate, and treating the remaining mixture to recover potassium salts.

In testimony whereof I have hereunto set my hand at San Francisco, California, this 19th day of June 1918.

GEORGE B. BURNHAM.

In presence of—
H. G. PROST.